United States Patent [19]

Bahary

[11] 4,380,578

[45] Apr. 19, 1983

[54] ELECTROCHEMICAL CELL WITH GELLED ANODE

[75] Inventor: William S. Bahary, Pearl River, N.Y.

[73] Assignee: Duracell Inc., Tarrytown, N.Y.

[21] Appl. No.: 297,664

[22] Filed: Aug. 31, 1981

[51] Int. Cl.³ .................... H01M 4/02; H01M 6/04
[52] U.S. Cl. ................................ 429/206; 429/212
[58] Field of Search ............... 429/212, 215, 214, 218, 429/27, 224, 206; 252/182.1, 510, 518

[56] References Cited

U.S. PATENT DOCUMENTS

| | | | |
|---|---|---|---|
| 3,871,918 | 3/1975 | Viescou | 429/212 X |
| 3,877,983 | 4/1975 | Housepian | 429/212 X |
| 3,884,721 | 5/1975 | Tucholski | 429/212 X |
| 4,175,052 | 11/1979 | Norteman, Jr. | 429/212 X |
| 4,175,167 | 11/1979 | van Lier | 429/212 X |
| 4,332,870 | 6/1982 | Parsen et al. | 429/212 X |

*Primary Examiner*—Anthony Skapars
*Attorney, Agent, or Firm*—Ronald S. Cornell; Israel Nissenbaum

[57] ABSTRACT

An electrochemical cell having a gelled anode, wherein the gelling agent is an anionic polysaccharide having a rigid ordered structure such as extracellular microbial polysaccharides, particularly xanthan gum.

13 Claims, No Drawings

ELECTROCHEMICAL CELL WITH GELLED ANODE

FIELD OF THE INVENTION

The present invention relates to aqueous electrochemical cells and more particularly to cells having gelled anodes.

BACKGROUND OF THE INVENTION

Thickening or gelling agents, used in electrochemical cells to gel liquid electrolytes in order to reduce electrolyte leakage, until recently, have mainly been of natural products such as starch, cellulose or their derivatives. However, on standing or during cell discharge, a large percentage of liquid separates from many of such thickened or gelled electrolytes. Further difficulties have been encountered in uniformly gelling large quantities of electrolyte and, thereafter, dispensing the gelled electrolyte into the cell. Such lack of uniformity, which generally worsens on standing as the liquid separates from the gel, can result in the inaccurate addition of electrolyte to the cell with resultant inconsistent cell properties. The high viscosity of such thickened or gelled electrolyte additionally increases the difficulty in pumping and accurately dispensing proper amounts of electrolyte into a cell.

The use of larger quantities of gelling agent may alleviate some of the separation problems but at the cost of displacing some of the active material in the cell. Furthermore, the greater degree of gelling of the electrolyte also generally decreases the ionic conductivity of the electrolyte which results in high internal cell resistance as well as increasing problems inherent with the already high viscosity of the gels.

In some cells instead of the electrolyte alone being gelled, a mixture of the electrolyte with either the anodic or cathodic material is gelled. However, the generally particulate anodic or cathodic materials tend to settle out from the gel or are clumped together by the gelling agent, resulting in lack of uniformity and similar inaccurate addition of anodic or cathodic materials to the cell. Further, the nonuniform gel results in uneven and inefficient consumption of the anodic or cathodic materials during cell discharge.

Materials which have been found to be capable of more uniformly gelling a liquid or a mixture of a liquid and particulate matter have, in some instances, not been stable in the strong alkali electrolyte used in many aqueous cells, particularly at the high temperatures and after the long storage periods to which such cells are subjected. Further, such materials are wholly or partially petroleum based, in contrast to the previously used gelling agents, which were based on vegetable material. With the present high price of petroleum, such petroleum based gelling agents have become very costly. Additionally, some of the monomers or intermediates used in the manufacture of the petroleum based gelling agents may adversely affect the environment.

THE INVENTION

It has now been discovered that anionic polysaccharides, having rigid ordered structures, such as extracellular microbial polysaccharides particularly xanthan gum (produced by the fermentation of the microbe *Xanthomonas campestris*) can readily and satisfactorily gel an intimate mixture of a powdered anode metal such as zinc and an aqueous alkaline electrolyte, for use as an anode in an electrochemical cell. The gelled mixture is easily handled and dispensed due to its psuedoplastic properties which produce a low apparent viscosity when the gel is subjected to shear such as during mixing or pumping. Furthermore, in the presence of strong alkaline electrolyte the gel solidifies on standing and remains stable in the presence of both the alkaline electrolyte and anode metal. There is substantially no separation of liquid or metal from the gel during handling or dispensing and substantially no separation of liquid or metal from the solidified gel on standing. It has also been found that the use of this gelling agent unexpectedly increases the practical discharge capacity of the anode, while reducing the amount of cell gassing, when compared to similar cells containing ungelled anodes or anodes gelled with natural products such as plant starches or cellulose. Further, the use of the anionic rigidly ordered polysaccharide has been found not to adversely affect the internal resistance of the cell.

The stability of xanthan gum in particular in alkali cell environments was surprising since product literature indicates that concentrations of NaOH higher than 12% may cause precipitation. In fact, much higher concentrations of sodium or potassium hydroxide (30–40 percent), are generally used in aqueous alkaline electrochemical cells. However, it has been found that at such much higher hydroxide concentrations no liquid or solid separates from the gel. Furthermore, gelatinization itself with xanthan gum does not adversely affect cell performance as compared to gels formed from other natural product gelling agents. Additionally, xanthan gum gel does not degrade either physically or chemically in the presence of the strong aqueous alkali and there are, accordingly, substantially no degradation byproducts to interfere with or adversely affect cell performance.

The anionic polysaccharides useful as gelling agents in the present invention are of high molecular weight (1–20 million g/mol) and have a rigid ordered structure whereby they are highly viscous, at relatively low concentrations. The rigid structure is the result of cooperative effects within the polymeric molecules of the anionic polysaccharide. The rigid ordered structures generally assume helical, double helical, rod-like, pleated sheet or similar configurations, whereby relative movement of the molecules is retarded with resultant increased viscosity even at low concentrations.

Anionic extracellular microbial polysaccharides such as xanthan gum which has been characterized as having a rigid helical structure (product literature from Kelco [division of Merck & Co., Inc.] on Xanthan Gum) have rigid ordered structures and are within the scope of the present invention whereby they are capable of effectively gelling an intimate mixture of a powdered anode metal and an aqueous alkaline electrolyte. These microbial polysaccharide gelling agents are produced by the action, such as fermentation, of various microorganisms with resultant rigid structures. The useful polysaccharide gelling agents produced by these microorganisms generally have a backbone formed of linked saccharide units, with short side chains attached to the backbone which side chains are anionic or become anionic in an aqueous alkaline medium. Alternatively, the backbone may contain the anionic moiety.

The following table adapted from Encyclopedia of Polymer Science and Technology (1968 ed.), Volume 8, page 696 (Table 2) illustrates the composition and microbial derivation of xanthan gum and other microbial polysaccharides. It is noted, particularly with respect to Xanthan gum, that the product literature attributes the rigidity of the Xanthan gum molecule in part to the $\beta(1-4)$ linkages, which provide the requisite cooperative effect and utility for the present invention.

TABLE
ANIONIC, EXTRACELLULAR MICROBIAL POLYSACCHARIDES
Composition of polysaccharide

| Micro-organism | Components | Molar Ratio | Linkages[a] |
|---|---|---|---|
| Xanthomonas campestris (xanthan gum) | D-mannose | 3.0 | GA($\beta$, 1-2)M |
| | D-glucose | 3.0 | M(1-4)G |
| | D-glucuronic acid (K salt)[b] | 2.0 | G(1-4)GA |
| | O—acetyl | 1.7 | G($\beta$, 1-4)G |
| | pyruvic acid | 0.63 | |
| Arthrobacter viscosus | D-glucose | 1 | MA($\beta$, 1-4)G |
| | D-galactose | 1 | G($\beta$, 1-4)Gal |
| | D-mannuronic acid (K salt) | 1 | Gal($\beta$, 1-4)MA |
| | O—acetyl | | |
| Cryptococcus laurentii var. flavescens | D-mannose | 4 | M(1-3)M |
| | D-xylose | 1 | X(1-[c])M |
| | D-glucuronic acid (K salt) | 1 | GA($\beta$, 1-2)M |
| | O—acetyl | 1.7 | |
| Hansenula holstii | D-mannose | 5 | M($\alpha$, 1-)PO$_4$K (-6)M |
| | potassium | 1 | M($\alpha$, 1-3)M |
| | phosphorus[d] | 1 | M($\alpha$, 1-2)M |

[a]Identification of symbols: Gal, D-galactopyranose; G, D-glucopyranose; GA, D-glucopyranosyl uronic acid; M,D-mannopyranose; MA,D-mannopyranosyl uronic acid; X, D-xylose.
[b]Other salts could be made.
[c]Position of linkage is not established.
[d]Orthophosphate

DESCRIPTION OF THE PREFERRED EMBODIMENTS

The preferred agent of the present invention is the anionic extracellular microbial polysaccharide produced by the growth of the microorganism *Xanthomonas campestris*, commonly known as xanthan gum (and sold under the trademark Keltrol[R] and Kelzan[R] by Kelco, a division of Merck & Co., Inc., Biozan[R] by Hercules, Inc. and Flocon[R] by Pfizer, Inc.).

The preferred gelling agents used in the present invention are therefore biologically produced by microorganisms and are neither wholly nor partially petroleum based as are many other previously used gelling agents. The biological production of the gelling agent not only insures adequate supply and price stability, but also decreases the likelihood that the production of the gelling agent itself will adversely affect the environment.

The preferred anionic extracellular microbial polysaccharides of the present invention can be used alone or, to further increase viscosity, can be first admixed with a galactomannan (a neutral polysaccharide composed solely of mannose and galactose), such as locust bean gum (also known as carob gum) or guar gum, all naturally occurring plant materials, prior to being combined with the anode metal powder and the aqueous alkaline electrolyte to form the gelled anode. A ratio of 1:1 of xanthan gum and locust bean gum gives the maximum gel strength and is preferred. The structure of both guar gum and locust beam gums in particular are made up of a linear chain of $\beta$-(1-4) linked D-mannose units, and single unit D-galactose side chains attached to the backbone by $\alpha$-(1-6) links. For guar gum, the mannose to galactose ratio is about 1.8 and for locust bean gum the ratio is about 4.

The anionic rigid ordered polysaccharides such as xanthan gum, other useful anionic extracellular microbial polysaccharides and mixtures thereof with galactommanans, are preferably used in gelling the anodes of electrochemical cells having aqueous electrolyte solutions, with the anode comprising a gelled mixture of a powdered anodic metal, such as zinc or amalgamated zinc, an aqueous electrolyte and the gelling agent.

The gel can be formed in situ within the cell and after the cathode is in place in the cell. The electrolyte solution is poured into the cell and then the anode metal and the gelling agent are added with the mixture then gelling.

The preferred xanthan gum gelling ageent as well as other anionic extracellular microbial polysaccharides of the present invention can be manufactured by culturing the appropriate microorganisms, which are readily available and readily cultured, either in a batch or continuous flow process. Several methods of producing the agent are described in an article by F. R. Dintzis, et al. "Studies on dilute solutions and dispersions of the polysaccharide from *Xanthamonas campestris*" NRRL B1459, *Carbohydrate Research*, 13 (1970) 257–267. The desired material can be thereafter extracted from the culture and purified.

The gelling agent of the present invention can also be used in conjunction with a polyhydric alcohol to form an in situ gelled anode as set forth in co-pending patent application Ser. No. 106,955 filed Dec. 26, 1979, assigned to the same assignee as the present invention. In such a cell the polyhydric alcohol, anode metal and gelling agent are combined and then dispensed into a cell having a cathode and an electrolyte in place therein. The gelling agent in the mixture substantially uniformly absorbs electrolyte and the mixture forms an in situ gelled anode.

Alternatively, the gelled anode can be preformed outside of the cell, with the gelling agent such as xanthan gum, the anode metal and the electrolyte combined such that the powdered anode metal is substantially homogeneously dispersed throughout the gel with no significant settling of the metal being observed on storage. The gelled anode is thereafter dispensed into the cell.

The gelled anode of the present invention is initially extremely pseudoplastic, and when a stress beyond the yield point is applied to the gel, viscosity is reduced in proportion to the amount of shear. When the shear stress is removed, the viscosity of the gel almost instantaneously returns to its original level. Since the shear forces imparted to the gel by pumping it through cell filling equipment, and dispensing the gel into a cell are generally beyond the yield point of the gel, it can be pumped and dispensed almost as easily and accurately as the ungelled electrolyte. The ease of pumping and dispensing is in contrast to the difficulties encountered with most previously used gelling agents or thickeners, wherein not only did liquid separate from the gel, but wherein the high viscosity of the gel made pumping and dispensing difficult, slow, and inaccurate. The ease and accuracy with which the gel of the present invention is dispensed is an important advantage since it facilitates the use of high speed manufacturing equipment wherein large quantities of gel are rapidly moved and accurately dispensed. Additionally, the gel is not affected by repeated prolonged and/or severe shear forces thereby facilitating preparation of large quantities of the gel requiring long periods of mixing for increased uniformity.

Agitation of the gel either during mixing, movement to or into the cell, or within the cell also does not affect the gel because of the pseudo-plastic properties of the freshly mixed gel.

The gel formed from the preferred xanthan gum and strong alkaline electrolyte produces a gel which solidifies on standing and is substantially unaffected by changes in temperature and pH. This is particularly important in electrochemical cells which are subjected to a wide temperature range during shipping and storage wherein the anode metal tended to separate from the prior art gels and wherein the physical properties of such gels drastically changed with changes in temperature.

It has also unexpectedly been discovered that the use of the gelling agents of the present invention in aqueous cells having a zinc anode reduces the detrimental internal gas evolution common in these cells. As a result, the amount of relatively costly mercury, used for the purpose of decreasing gassing, may be minimized without detrimental effect. Such minimization of mercury use is advantageous both from an environmental and economic standpoint and is another advantage of the present invention.

The quantity of the gelling agent of the present invention useful in the cell can be very small compared to that required of other naturally occurring gelling or thickening agents. As little as about 0.2 percent gelling agent by weight of the gelled anode is useful, with the preferred quantity of gelling agent varying between about one and about two percent by weight of the gelled anode. As much as about ten percent by weight of the gelled anode can also be used without detrimentally affecting the cell.

In the present invention wherein the anode is a gelled mixture of an anode metal and an electrolyte solution, useful anode metals are those generally used in cells having an aqueous electrolyte. Such anode metals include cadmium, calcium, copper, indium, iron, lead, magnesium, manganese, mercury, nickel, tin, zinc and other metals known in the art, used either alone or in various combinations. In the preferred cell, the anode metal comprises powdered amalgamated zinc, wherein an increase in discharge capacity, at high rates, of about 15% is achieved in comparison to cells having prior art cellulose type gelled anodes.

Fine anode metal powders having particle diameters of from about 0.03 to 0.9 millimeters are particularly preferred, since such fine powders provide a large surface area exposed to the electrolyte. Such fine powders are also readily, substantially uniformly dispersed throughout the gel by the gelling agents of the present invention.

In the preferred cell, the electrolyte comprises an aqueous alkaline solution. Such preferred solutions include, but are not limited to, hydroxides of alkali and alkaline earth metals with sodium and/or potassium hydroxide being the most commonly used alkaline electrolytes. Generally such electrolytes are from 30–40% aqueous hydroxide solutions in commercial alkaline cells.

Cathodes commonly used in aqueous electrochemical cells include, but are not limited to, oxidized metals, such as cadmium oxide and hydroxide, mercuric oxide, lead oxide, manganese dioxide, nickel oxide and hydroxide, and silver oxide; and air.

The advantages and efficacy of the present invention are illustrated in the following examples. In the examples and throughout the disclosure and claims, all percentages, unless otherwise indicated, are by weight.

EXAMPLE 1

A gelled anode-electrolyte mixture is formed by combining 100 kilograms of amalgamated zinc powder, which is 93 percent zinc and 7 percent mercury, with 1.6 kilograms of xanthan gum (sold under the trademark KELZAN by Kelco, a division of Merck and Co., Inc., San Diego, Calif. This mixture is added to 80 kilograms of an aqueous electrolyte solution with constant agitation until the mixture is thoroughly blended and gels. The electrolyte solution comprises an aqueous solution of about 37 percent potassium hydroxide. The separation of liquid from the gel on standing and its percent dispersion defined as $$\left(\frac{1-H_L}{H_T}\right) \times 100$$

wherein $H_L$ is the height, if any, of a liquid phase above the gelled anode, and $H_T$ is the height of the gelled anode is measured. After two days the percent dispersion is 100 percent, indicating no separation at all. After one month the dispersion is about 80 percent, and remains about the same even after twelve months.

A cell is made with a cathode comprised of about 40 grams of manganese dioxide and about 5 grams of graphite, a cellulose type separator, about 7 milliliters of the aqueous electrolyte solution, and about 30 grams of the gelled anode-electrolyte mixture.

On discharge, the cell exhibits electrical characteristics similar to cells made with conventional gelling materials such as sodium carboxymethyl cellulose but exhibits a higher discharge capacity by about fifteen percent. Upon the storage of the cells for a period of about one week at temperatures of 27° C. and 50° C., significantly less gas evolution is evident on storage than with cells using the cellulose gelling materials.

EXAMPLE 2

A gelled mixture, as in Example 1, is prepared by combining 100 kilograms of amalgamated zinc anode powder, which is 93 percent zinc and 7 percent mercury with 1.6 kilograms of a powdered gelling agent. The powdered gelling agent is a mixture of about 0.96 kilograms of zanthan gum and about 0.64 grams of guar gum sold under the trademark Galactasol. To the mixture, 98 kilograms of the aqueous electrolyte solution of Example 1 is added with constant agitation until the mixture is thoroughly blended. The resultant gel provides a 91% dispersion after two days of standing. However, after one month and twelve months the percent dispersion is about 86 percent. Long term stability is therefore enhanced by the addition of the guar gum.

A portion of the resultant gel is used in a cell such as that formed in Example 1. On discharge the cell exhibits electrical characteristics similar to the cell formed in Example 1.

EXAMPLE 3

A dry mixture is made by combining 100 kilograms of amalgamated zinc powder, which is 93 percent zinc and 7 percent mercury with 1.6 kilograms of xanthan gum as described in Example 1.

A cell is made as in Example 1 but with 15 milliliters of an aqueous electrolyte solution comprised of about 35 percent by weight of potassium hydroxide, and about 17 grams of the dry, amalgamated zinc-xanthan gum mixture.

The powdered xanthan gum absorbs the electrolyte solution, in the cell and forms a gel. On standing, liquid does not separate out from the gel, nor does the amalgamated zinc settle out. The density of the gelled mixture is lower than that of a mixture of similar compositions using the conventional cellulosic gelling materials.

On discharge, the cell exhibits electrical characteristics similar to those cells made with gelling agents such as sodium carboxymethyl cellulose but the cell exhibits about a 15% increase in discharge capacity.

Upon storage of the cell for a period of one week at room temperature, and at a temperature of 50° C., much less hydrogen evolution is evident on storage than with prior art cells using a cellulose type gelling agent.

EXAMPLE 4

A dry mixture is made by combining 100 kilograms of amalgamated zinc powder, which is 93 percent zinc and 7 percent mercury with about 250 grams each of glycerine, and water, and then 1.6 kilograms of xanthan gum are added.

A cell is made as in Example 3 but with about 17 grams of the dry, amalgamated zinc, glycerine, water and gellant mixture.

The gel formed is more uniform than that achieved without the use of the glycerine and the small quantity of water. On standing, liquid does not separate out from the gel, nor does the amalgamated zinc settle out. The density of the gelled mixture is lower than that of a mixture of similar compositions using the conventional cellulose gelling materials. Discharge and storage characteristics are similar to those of the cell of Example 3.

EXAMPLES 5-21

Cells are made in accordance with the procedures described in Examples 1 to 4 but using cadmium, calcium, copper, lead, indium, iron, magnesium, manganese and amalgams thereof, respectively, as the powdered metal anode. The cells are tested similarly and are found to have equal or better discharge characteristics than cells which are made using the same metal anodes without the xanthan gum gelling agent.

EXAMPLES 22-25

Cells are made in accordance with the procedures described in Examples 1 to 4, but in which about 91 grams of silver oxide is used to replace the manganese dioxide in the cathode. The cells are tested similarly and are found to have equal or better discharge characteristics than similar cells which are made using metal anodes without the xanthan gum agent.

EXAMPLES 26-29

Cells are made in accordance with the procedures described in Examples 1 to 4, but in which about 129 grams of mercuric oxide is used to replace the manganese dioxide in the cathode. The cells are tested similarly and are found to have equal or better discharge characteristics than cells which are made using metal anodes without the agents described herein.

The preceeding examples are for illustrative purposes only. It is understood that variations and changes can be made without departing from the spirit and scope of the present invention as defined in the following claims.

What is claimed is:

1. A gelled anode for an electrochemical cell comprising a powdered anode active metal, an aqueous alkaline electrolyte and a gelling agent characterized in that said gelling agent is comprised of an anionic rigid ordered polysaccharide.

2. The anode of claim 1 wherein said anionic rigid ordered polysaccharide is an anionic extracellular microbial polysaccharide.

3. The anode of claim 2 wherein said anionic extracellular microbial polysaccharide is xanthan gum.

4. The anode of claim 2 wherein said gelling agent is further comprised of a galactomannan.

5. The anode of claim 4 wherein said galactomannan is selected from the group consisting of guar gum and lucust bean gum.

6. The anode of claim 1 wherein said anode further contains a polyhydric alcohol.

7. The anode of claim 1 wherein said gelling agent is present in a range of 0.2% to 10% by weight of said gelled anode.

8. The anode of claims 1, 2, 3, 4, 5, 6 or 7 wherein said powdered anode metal is comprised of a member of the group consisting of zinc and amalgamated zinc.

9. The anode of claim 1 wherein said aqueous alkaline electrolyte is comprised of an aqueous potassium hydroxide solution.

10. An electrochemical cell comprised of an aqueous alkaline electrolyte, a cathode and the gelled anode of claims 1, 2, 3, 4, 5, 6, 7 or 9.

11. An electrochemical cell comprising an aqueous alkaline electrolyte, a cathode comprised of a material selected from the group consisting of manganese dioxide, silver oxide, mercuric oxide, nickel oxide and hydroxide, lead oxide, cadmium oxide and the gelled anode of claims 1, 2, 3, 4, 5, 6, 7, or 9.

12. An electrochemical cell comprising an aqueous alkaline electrolyte, a cathode selected from the group consisting of manganese dioxide, silver oxide, mercuric oxide, nickel oxide and hydroxide, lead oxide, cadmium oxide and a gelled anode of claims 1, 2, 3, 4, 5, 6, 7, or 9, wherein said active anode metal is zinc.

13. An electrochemical cell comprising an aqueous potassium hydroxide electrolyte, a $MnO_2$ cathode and a gelled anode of claims 1, 2, 3, 4, 5, 6, 7 or 9, wherein said active anode metal is zinc.

* * * * *